Patented June 23, 1953

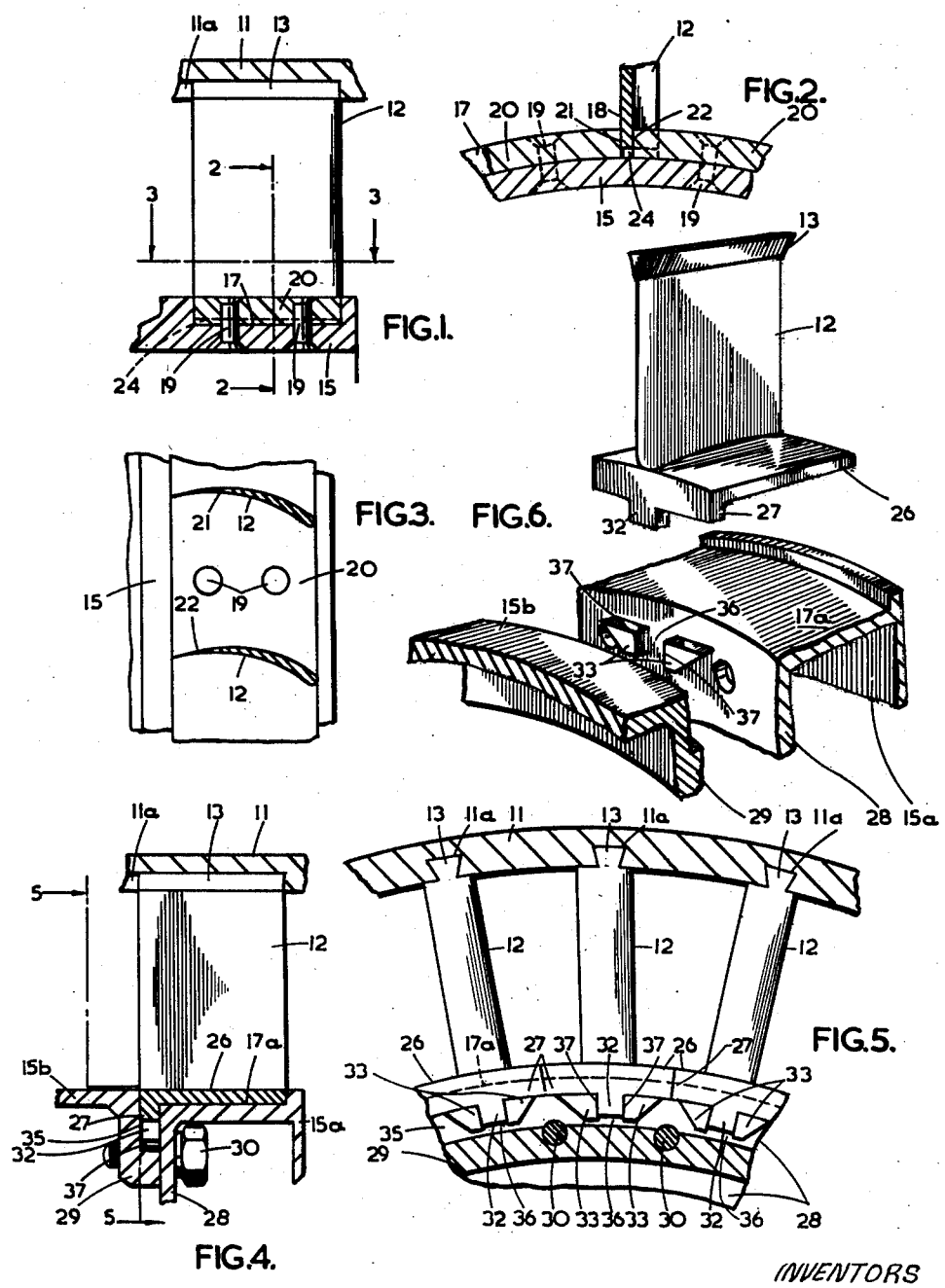
June 23, 1953   A. THOMAS ET AL   2,643,086
MOUNTING OF TURBINE BLADES
Filed Oct. 23, 1947
INVENTORS
A. THOMAS &
L. R. FELLOWS
BY Mawhinney & Mawhinney
ATTYS.

2,643,086

UNITED STATES PATENT OFFICE 2,643,086

MOUNTING OF TURBINE BLADES

Albert Thomas and Leslie Richard Fellows, Coventry, England, assignors to Armstrong Siddeley Motors Limited, Coventry, England Application October 23, 1947, Serial No. 781,512
In Great Britain September 2, 1947

3 Claims. (Cl. 253—78)

1

This invention relates to an axial flow turbine, and particularly an internal-combustion turbine.

The main object of the invention is to provide an improved means for mounting the stator blades, particularly the first row of stator blades, so that they will be adequately supported both at ambient temperatures and when working temperatures are reached.

According to the invention, an axial flow turbine stator has radially-extending blades fast with an outer casing and engaged with an inner casing which provides location for the inner ends of the blades except against sliding in a radial direction. Thus, as the outer casing expands (when working temperatures are reached), the blades can slide radially outwardly, relatively to the inner casing, which, it is found, does not expand radially, at all events to the same extent as the outer.

In one construction according to the invention, the inner casing has an external circumferential groove to provide axial location for the inner ends of the blades, and spacers secured to the inner casing in the groove between the inner ends of adjacent blades to provide circumferential location.

In an alternative construction the inner casing has an external circumferential groove to provide axial location for the inner ends of the blades, and the said inner ends have parallel-sided radial teeth engaged with corresponding slots in the inner casing for circumferential location.

In the accompanying drawings:

Figure 1 is a fragmentary sectional view showing one method by which a turbine blade of the first row can be secured to the stator;

Figure 2 and Figure 3 are sections taken, respectively, on the lines 2—2 and 3—3 of Figure 1;

Figure 4 is a fragmentary sectional elevation similar to that of Figure 1 but showing an alternative method of mounting a stator blade of the first row;

Figure 5 is a fragmentary sectional elevation taken on the line 5—5 of Figure 4; and, Figure 6 is an exploded perspective view showing one blade and a fragment of the inner casing.

A portion of the outer casing of the turbine stator is indicated at 11 in the various figures of the drawings, and the blades 12, 12 have their radially outer ends rigidly secured therein in any convenient manner. Thus, as shown by way of example, the blades may be formed with dovetailed portions, 13, 13, secured in appropriate slots 11a in the outer casing 11, but it will be understood that other fixing means may be employed if preferred.

The inner stator casing is indicated at 15 in the various figures, and the problem is to support the radially-inner ends of the blades 12 so that they are properly located in all directions except for their ability to move radially.

In the construction of Figures 1 to 3 the inner casing 15 has a peripheral groove 17 which receives the radially-inner ends 18 of the blades to provide axial location (that is, location in the direction of the turbine axis) for the inner ends.

Secured in the groove 17 between the inner ends of each pair of adjacent blades 12, as by rivets 19, 19 or in other ways, is a spacer 20 adapted to fit the groove in an axial direction and having its opposite edges 21, 22 shaped according to the shaping of the corresponding edges of the inner ends of the blades. In this way the blades are circumferentially located—i. e., against movement in a circumferential direction of the stator.

As working temperatures are being reached the outer casing 11 expands radially relatively to the inner casing 15, and the blades 12, being fast with the outer casing, can therefore move radially at their inner ends in the shaped slots provided between two adjacent spacers 20, thereby increasing the clearance, indicated at 24, from the bottom of the groove 17, without breaking down the seal at the inner ends of the blades.

In the construction of Figures 4 to 6 the inner casing of the stator is built-up of two portions 15a and 15b which jointly provide a circumferential groove 17a providing axial location for the inner ends of the blades 12. Each blade in this instance is formed with a shroud 26 engaged within the groove 17a, the shrouds abutting one another in the circumferential direction as shown by Figure 5.

In addition, the shrouds are formed along one edge with flange portions 27 which are shown in Figure 5 as providing a continuous flange; but it will be understood that the flange portions need not provide a continuous flange. They are gripped between the two flanges 28, 29 (of the casing portions 15a, 15b) the flange 29 being recessed to form, when the casing portions are secured together as by screws 30, a circumferentially extending groove 35 which is deeper than the groove 17a, and in which the flange portions 27 are received. These flange portions 27 may also serve for axial location purposes, if desired, instead of the shrouds 26 being used for this purpose.

Finally, for circumferential location purposes, each flange portion 27 is formed with an inwardly-extending, parallel-sided tooth 32 which engages in a slot 36 formed by parallel faces 37 of two coacting lateral teeth 33, 33, which are formed on the adjacent face of the flange 28 to lie within the slot 35, and extend in an axial direction to abut the adjacent radial face of a flange 29. A pair of teeth 33, 33 is provided for circumferentially locating the tooth 32 of each of the blades 12 forming the turbine stator, the pairs of teeth being spaced circumferentially around the slot 35 as shown by Figure 5.

It will be observed that with these methods of mounting the inner ends of the stator blades no labyrinth packings are necessary, and the inner ends can move radially relatively to the inner casing 15 as working temperatures are being reached and, of course, when ambient temperatures are being reached after the turbine has been stopped.

What we claim as our invention and desire to secure by Letters Patent of the United States is:

1. An axial flow internal combustion turbine including an outer stator casing, an inner stator casing providing with the outer casing an annular passage for the hot gases, a row of radially-extending turbine blades in said passage and having their outer ends fast with said outer casing, said inner casing built up of separable parts with axially-spaced radial walls defining between them a circumferential groove of which one axial end is deeper than the rest, shrouds at the radially inner ends of said blades engaging said radial walls for locating said blades axially of said inner casing, circumferentially-spaced teeth fast with one radial wall of said deeper portion of said circumferential groove and extending axially across said deeper portion, said teeth arranged in pairs with the adjacent faces of the teeth of each pair defining a parallel-sided recess, and said shrouds having radial teeth slidably engaged in said recesses to locate said blades circumferentially of said inner casing.

2. An axial flow internal combustion turbine including an outer stator casing, an inner stator casing providing with the outer casing an annular passage for the hot gases, a row of radially-extending turbine blades in said passage and having their outer ends fast with said outer casing, the periphery of said inner casing built up of two separable parts providing axially-spaced radial walls defining between them a circumferential groove of which one axial end is deeper than the rest, shrouds at the radially inner ends of said blades engaging said radial walls for locating said blades axially of said inner casing, radially-inwardly directed flanges of said shrouds engaged in said deeper end of said groove, circumferentially-spaced teeth fast with one radial wall of said deeper portion of said circumferential groove and extending axially across said deeper portion, said teeth arranged in pairs with the adjacent faces of the teeth of each pair defining a parallel-sided recess, and said shroud flanges having radial teeth slidably engaged in said recesses to locate said blades circumferentially of said inner casing.

3. An axial flow internal combustion turbine including an outer stator casing, an inner stator casing providing with the outer casing an annular passage for the hot gases, a row of radially-extending turbine blades in said passage and having their outer ends fast with said outer casing, said inner casing built up of two separable parts having peripheries of different diameters and flanges at their remote ends providing radial walls, said radial walls and different diameter peripheries defining a stepped circumferential groove, shrouds at the radially inner ends of said blades engaging said radial walls for locating said blades axially of said inner casing, radially-inwardly directed flanges at the one ends of said shrouds engaged between the step of said stepped circumferential groove and the radial wall which faces said step, said step formed with axially-extending circumferentially-spaced teeth, said teeth arranged in pairs with the adjacent faces of the teeth of each pair defining a parallel-sided recess, and said shroud flanges having coacting radial teeth slidably engaged with the teeth on said step to locate said blades circumferentially of said inner casing.

ALBERT THOMAS.
LESLIE RICHARD FELLOWS.

References Cited in the file of this patent

UNITED STATES PATENTS

| Number | Name | Date |
|---|---|---|
| 775,108 | Elliott | Nov. 15, 1904 |
| 974,160 | Kudlich | Nov. 1, 1910 |
| 2,402,418 | Kroon | June 18, 1946 |
| 2,427,244 | Warner | Sept. 9, 1947 |
| 2,445,661 | Constant et al. | July 20, 1948 |
| 2,447,942 | Imbert et al. | Aug. 24, 1948 |
| 2,488,867 | Judson | Nov. 22, 1949 |

FOREIGN PATENTS

| Number | Country | Date |
|---|---|---|
| 107,788 | Sweden | June 29, 1943 |